United States Patent [19]

Silva

[11] 4,164,621

[45] Aug. 14, 1979

[54] CABLE SHIELD CONNECTING DEVICE

[75] Inventor: Frank A. Silva, Basking Ridge, N.J.

[73] Assignee: Amerace Corporation, New York, N.Y.

[21] Appl. No.: 822,947

[22] Filed: Aug. 8, 1977

[51] Int. Cl.² .............................................. H01R 5/00
[52] U.S. Cl. ....................................... 174/78; 29/628; 156/49; 174/88 C
[58] Field of Search ..................... 174/75 C, 78, 88 R, 174/88 C, 84 R, 35 C, 72 A; 389/14 R, 14 C, 251; 336/84 C; 156/49; 29/628; 132/161, 162

[56] References Cited

U.S. PATENT DOCUMENTS

| | | | |
|---|---|---|---|
| 79,747 | 7/1868 | Foster | 132/162 |
| 1,025,156 | 5/1912 | Potter | 132/162 |
| 1,040,711 | 10/1912 | longden | 132/161 X |
| 2,227,451 | 1/1941 | Huppert | 132/161 |
| 2,685,075 | 7/1954 | Mol | 339/251 X |
| 3,094,658 | 6/1963 | Bravenec et al. | 336/84 C |
| 3,185,761 | 5/1965 | McHugh | 174/72 A X |
| 3,324,234 | 6/1967 | Hervig | 174/78 X |
| 3,445,580 | 5/1969 | Lusk | 174/78 X |
| 3,448,430 | 6/1969 | Kelly | 174/78 X |
| 3,465,092 | 9/1969 | Schwartz | 174/78 |
| 3,656,084 | 4/1972 | Malia | 174/73 R |
| 3,728,472 | 4/1963 | Leuteritz et al. | 174/84 R |
| 4,032,205 | 6/1977 | Taj | 174/78 |

FOREIGN PATENT DOCUMENTS

| | | | |
|---|---|---|---|
| 133674 | 1/1933 | Austria | 132/161 |
| 2342967 | 6/1975 | Fed. Rep. of Germany | 174/84 R |
| 94560 | 7/1959 | Norway | 174/78 |
| 881013 | 11/1961 | United Kingdom | 339/142 |
| 1213737 | 11/1970 | United Kingdom | 339/251 |
| 1431167 | 4/1976 | United Kingdom | 156/49 |

Primary Examiner—Thomas J. Kozma
Attorney, Agent, or Firm—S. Michael Bender; Ken Richardson; Arthur Jacob

[57] ABSTRACT

A cable shield connecting device for installation on a high voltage cable of the type having a metallic shield, the device including a relatively conformable, looped metal bar for placement around a bared portion of the metallic shield to extend circumferentially around a major portion of the circumference of the metallic shield while being spaced radially therefrom, a plurality of relatively flexible metallic fingers affixed to the bar, projecting from the bar in an axial direction and spaced circumferentially along the bar, each finger being attached to the metallic shield at a portion located remote from the bar to make electrical contact with the metallic shield, and a connecting conductor integral with the bar.

16 Claims, 10 Drawing Figures

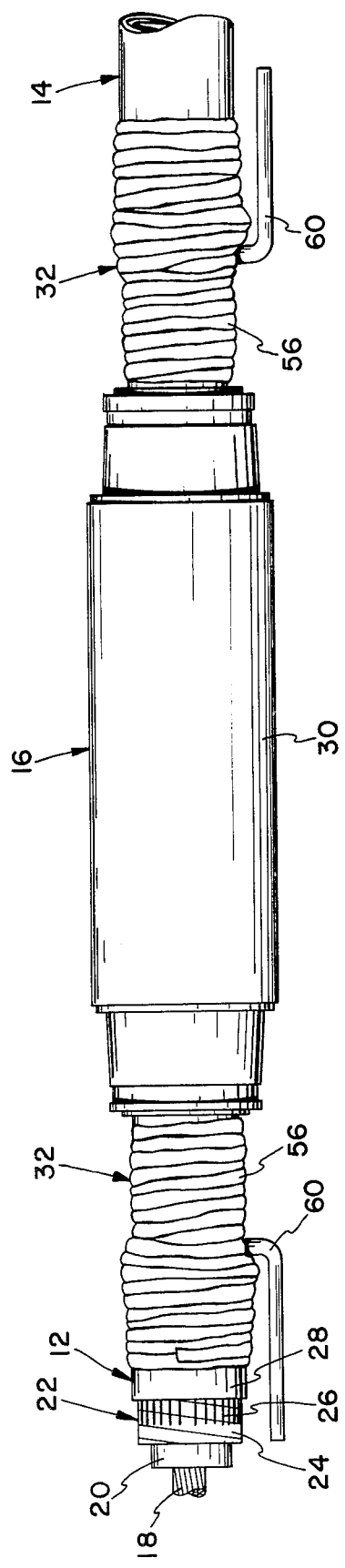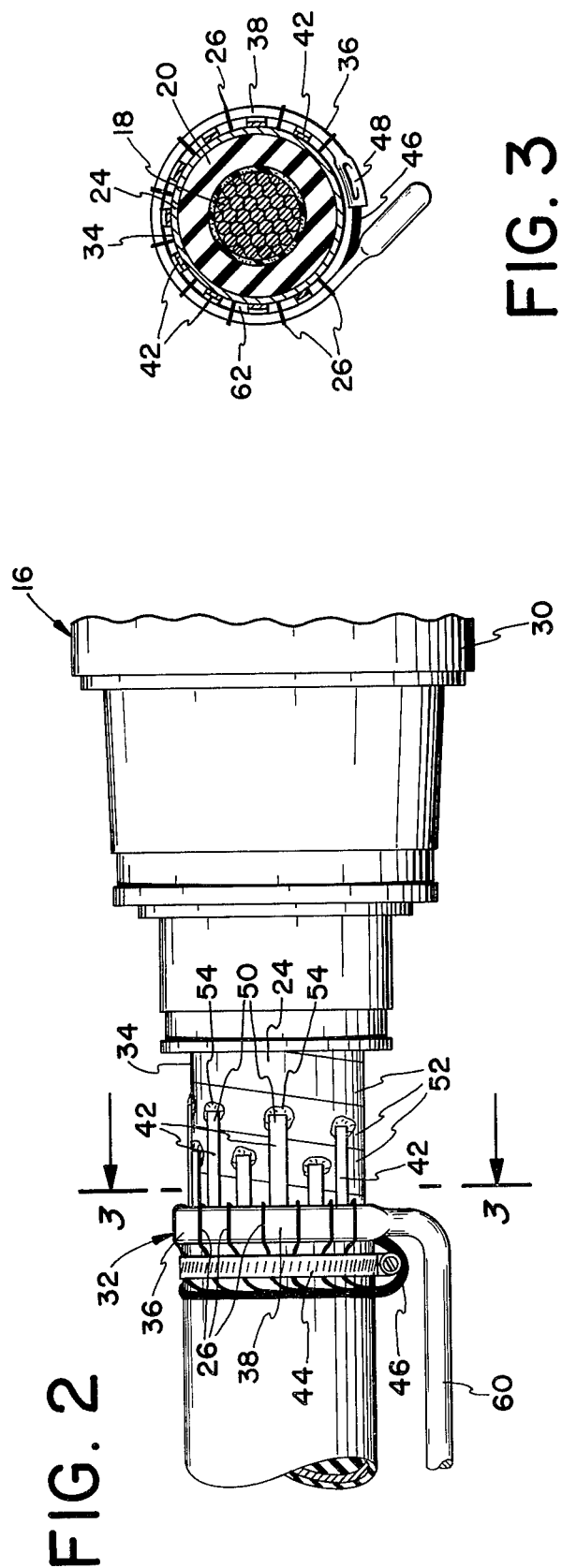

CABLE SHIELD CONNECTING DEVICE

This invention resulted from work done under Contract No. E(49-18)-1559 with the Energy Research and Development Administration.

The present invention relates generally to devices for connecting or terminating shielded high voltage power cables and pertains, more specifically, to connecting devices employed to facilitate connection to and the termination of metallic shields in such cables and to enable the utilization of currently available connectors and terminators with cables of the type employing metallic shields.

The continued development of underground electrical power distribution systems, especially in industrial, commercial and residential areas, has led to the evolution of various power distribution components, such as shielded electrical cables, transformers and electrical connectors, capable of service at higher voltages than previously attainable. Among these components, shielded electrical connectors and terminators have been developed which are readily assembled in the field at the terminal ends of shielded electrical cables so as to facilitate the construction and installation of higher voltage underground power distribution systems.

In installations where the shielded high voltage power cables are of the type having a central conductor surrounded by an insulator which, in turn, is surrounded by a shielding system including a metallic shield, it is often necessary to make connections to the metallic shield at prescribed locations, and especially adjacent the terminal ends of the cables where connectors or terminators are to be installed. It would be advantageous to have available a connecting device which would enable an effective connection to such a shielding system to be accomplished with ease in systems designed to operate at the higher voltages now accommodated by the newer power distribution components of the type described above.

An object of the present invention is to provide a connecting device which, when installed upon a high voltage power cable of the type having a metallic shield, will effectively connect to the metallic shield and operate at higher voltages than heretofore attainable with earlier devices of that type.

Another object of the invention is to provide a connecting device of the type described above which has a current-carrying capacity of the order of, and preferably at least as great as, that of the cable shielding system itself, as well as a capacity for handling higher voltages.

Still another object of the invention is to provide a connecting device of the type described which is fabricated largely in the factory and is easily installed in the field with a minimum number of operations requiring no special skills.

A further object of the invention is to provide a connecting device for facilitating connection to a shielding system in a power cable, the connecting device having means for contacting the various elements of a higher voltage cable shielding system and constructed so as to accommodate dimensional variations arising out of varying thermal conditions while maintaining an effective electrical connection.

A still further object of the invention is to provide a connecting device of the type described having a relatively simple construction which is economically fabricated as well as easy to install.

The above objects, as well as still further objects and advantages, are attained by the present invention which may be described briefly as a connecting device for use in connection with a shielded high voltage power cable of the type having an inner conductor, insulation surrounding the conductor, and a shielding system including a metallic shield surrounding the insulation, the connecting device comprising a looped, electrically conductive bar capable of being placed circumferentially around a bared portion of the shielding system and having a longitudinal extent great enough to enable the bar to extend circumferentially around a major portion of the circumference of the cable at the bared portion of the shielding system, a plurality of electrically conductive fingers affixed to the bar and projecting therefrom in an axial direction so as to extend axially along the metallic shield when the bar is so placed circumferentially around the cable, each finger having an axially extending length and a portion located remote from the bar for being attached to the metallic shield so as to make electrical contact therewith, and a connecting conductor electrically connected to and extending from the bar.

The invention will be more fully understood, while still further objects and advantages will be made apparent, in the following detailed description of preferred embodiments of the invention illustrated in the accompanying drawing, in which:

FIG. 1 is a plan view illustrating a completed installation in which two connecting devices constructed in accordance with the invention are employed in conjunction with an electrical connection made between the terminal ends of a pair of shielded high voltage electrical cables;

FIG. 2 is an enlarged fragmentary plan view of one end of the installation with portions removed to reveal details of one of the installed connecting devices;

FIG. 3 is a cross-sectional view taken along line 3—3 of FIG. 2;

Figure 4:
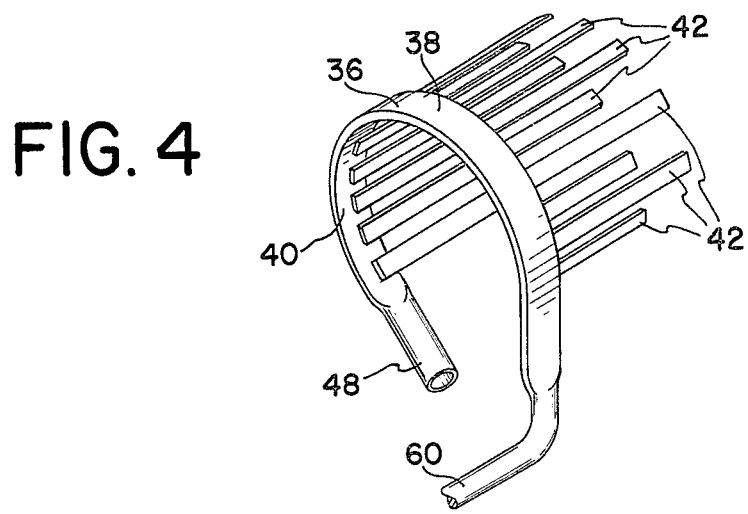
FIG. 4 is a perspective view of a connecting device of the invention, prior to installation.

Referring now to the drawing, and especially to FIG. 1 thereof, there is illustrated a pair of high voltage cables 12 and 14 which are connected together mechanically as well as electrically by means of a shielded electrical connector 16 and which form a part of an underground power distribution system. The cables 12 and 14 are of the type having a central conductor 18 surrounded by insulation 20 which, in turn, is surrounded by a shielding system 22 which, in this instance, includes a metallic shield in the form of a metallic shielding tape 24 and a plurality of wire strands 26 overlying the shielding tape 24 (also see FIG. 5). The shielding system 22 is surrounded by a protective outer jacket 28 which usually is constructed of an extruded synthetic resin or an elastomer and, in some instances, is fabricated of a conductive elastomer.

The connector 16 is of the type having a composite housing 30 in which a continuous shield is provided by an outer member of conductive elastomeric material so that a continuous shield is provided along the connector 16 between the terminated shielding systems 22 of the cables 12 and 14. However, it is not desirable that the shielding systems 22 be connected solely through the shield provided by the conductive elastomer of the housing 30. Therefore, it becomes necessary to accommodate the current which might appear in the shielding systems of the cables 12 and 14 in some other manner.

In order to accommodate the current-carrying capacity of the shielding system 22 of each cable 12 and 14, a connecting device 32, constructed in accordance with the invention, is affixed over a bared portion 34 of the shielding system 22 in each cable 12 and 14. As best seen in FIGS. 2, 3 and 4, the connecting device 32 includes a bar 36 of electrically conductive material, such as copper or aluminum, in the form of a loop which enables the bar 36 to be placed over the bared portion 34 of shielding system 22 and to be bent so as to extend circumferentially around and conform to the bared portion 34. The longitudinal extent of bar 36 is great enough to enable the bar to extend circumferentially around a major portion, that is, more than 180°, of the circumference of the cable 12 at the bared portion 34 of the shielding system 22, as seen in FIG. 3. Bar 36 is a relatively conformable metal member which includes a first portion 38 capable of being conformed into an arcuate looped configuration and having a flattened cross-rectional shape and an inner surface 40. Annealed copper and aluminum are two materials which provide appropriate strength and rigidity combined with the ability to be conformed, by bending in the field, to close the looped configuration around a cable. A plurality of fingers 42 of electrically conductive material, ordinarily the same material as that of bar 36, are affixed to the bar 36 and project therefrom in an axial direction so as to extend axially along the shielding tape 24 when the bar 36 is placed circumferentially around the cable, as illustrated in FIGS. 2 and 3. Preferably, fingers 42 are affixed to the inner surface 40 and secured thereto in good electrical contact, as well as in effective mechanical connection, as by welding or brazing. Fingers 42 are spaced circumferentially from one another and are somewhat flexible relative to the more rigid structure of the bar 36.

Figure 5:
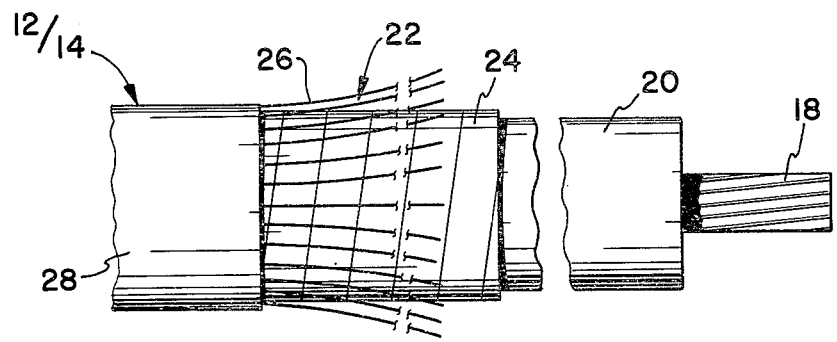
FIG. 5 is a plan view of the terminal end of a high voltage power cable, prepared for the installation of a connecting device.
Figure 6:
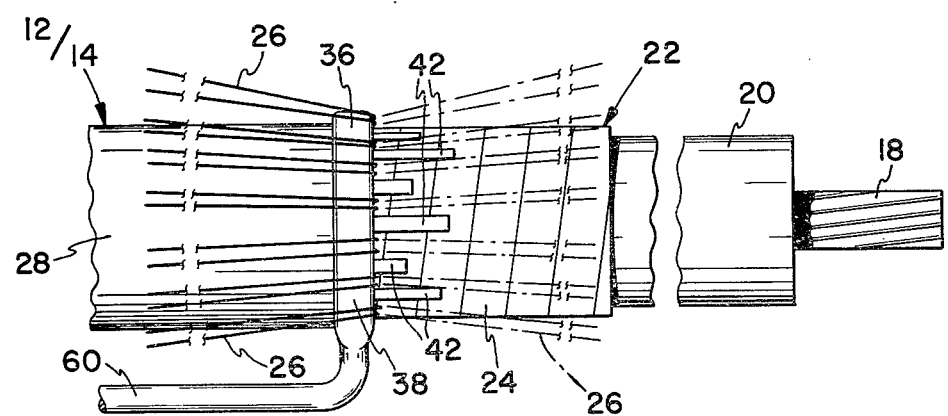
FIG. 6 is a plan view of the terminal end of the cable with the connecting device in an intermediate stage of installation.
Figure 7:
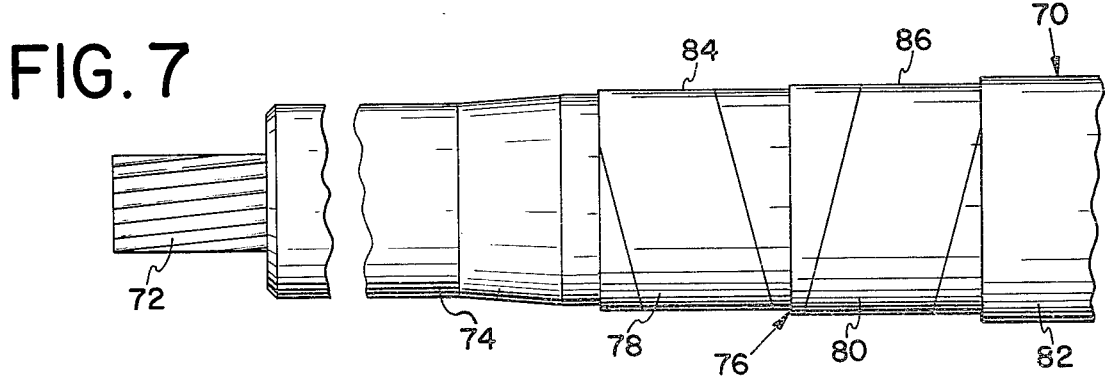
FIG. 7 is a plan view of the terminal end of a high voltage power cable of another type, prepared for the installation of another connecting device constructed in accordance with the invention.
Figure 8:
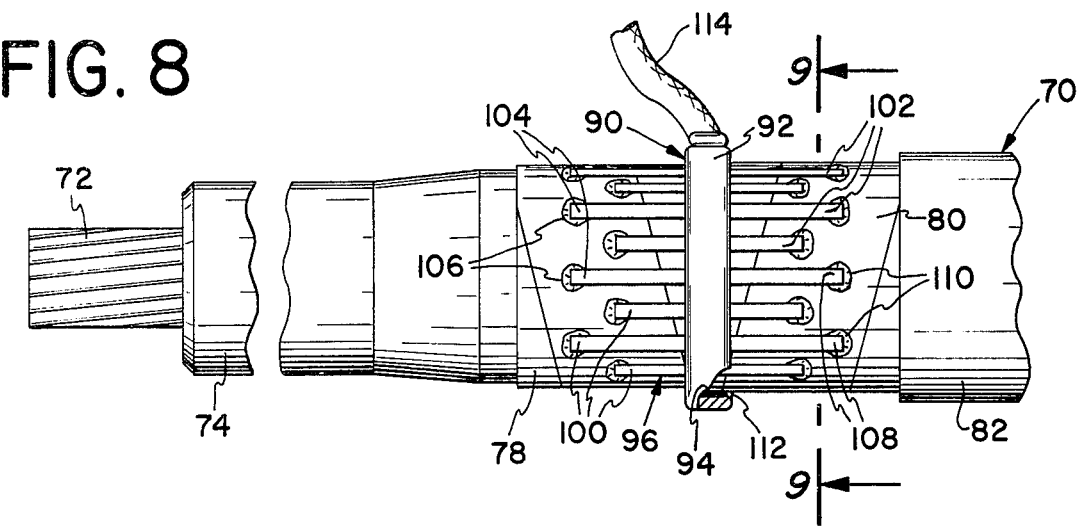
FIG. 8 is a plan view of the terminal end of the cable of FIG. 7 with the other connecting device installed thereon.
Figure 9:
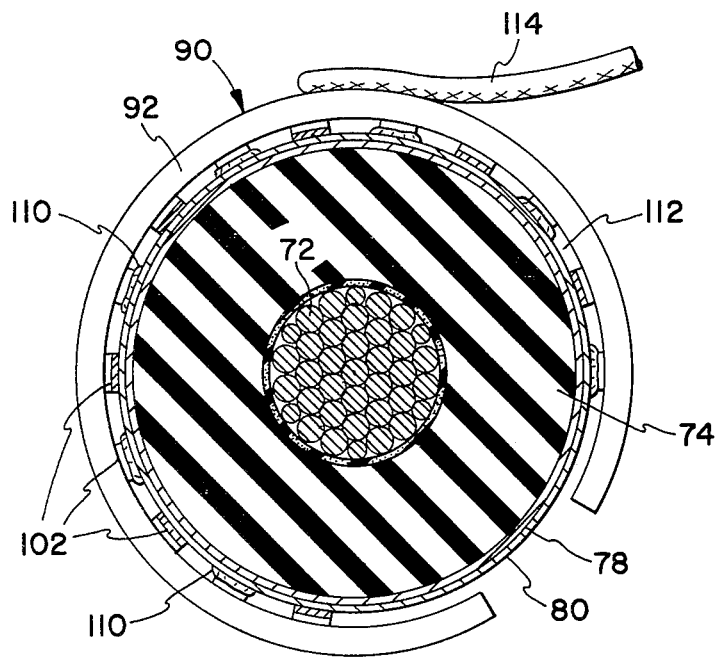
FIG. 9 is an enlarged cross-sectional view taken along line 9—9 of FIG. 8.
Figure 10:
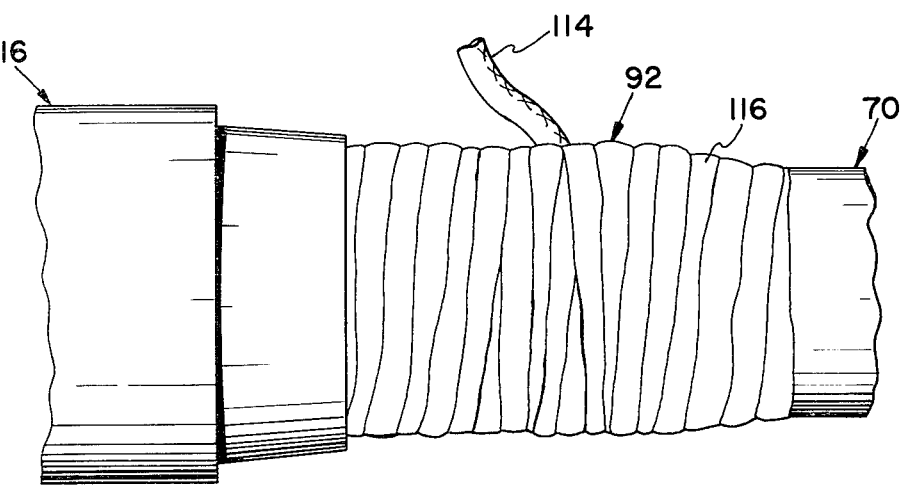
FIG. 10 is a plan view of a completed installation utilizing the connecting device of FIGS. 8 and 9.

During the installation of connector 16 and the related connecting devices 32, the bar 36 of each connecting device is usually placed over the terminal end of a respective cable after the cables are joined together by connector 16. As seen in FIG. 5, the terminal end of each cable 12 and 14 is prepared by removing a terminal portion of the outer jacket 28 to expose the shielding system 22, then cutting the shielding tape 24 to expose a length of insulation 20. A terminal portion of the insulation 20 is then removed to expose a length of conductor 18. Connector 16 is then installed over the exposed length of conductor 18 of each cable 12 and 14, and over the corresponding terminal portions of insulation 20 to connect the terminal ends of cables 12 and 14. The assembly of connector 16 at the terminal ends of the cables is accomplished in a now well-known manner. A connecting device 32 with bar 36 in the open looped configuration illustrated in FIG. 4 is then placed over the bared portion 34 of the shielding system 22 and bar 36 is bent to conform the bar to the cable and tend to close the arcuate portion 38 around the cable, as illustrated in FIG. 3. The wire strands 26 passing beneath the bar 36 are trained to pass between the circumferentially spaced fingers 42, as illustrated in phantom in FIG. 6. Once the bar 36 is in place on the respective cable, the wire strands 26 are bent back over the arcuate portion 38 of the bar, as seen in full lines in FIG. 6, and a clamp 44 is clamped over the wire strands 26 to secure the wire strands against the outer jacket 28, as shown in FIG. 2, thereby holding the bar 36 in place. The wire strands 26 are then gathered into a wire bundle 46 which is mechanically secured and electrically connected to the bar 36 by means of a ferrule 48 (see FIGS. 3 and 4) which is unitary with bar 36 and which receives the end of wire bundle 46 therein. The ferrule 48 is crimped to secure the wire bundle 46 therein and to assure a good electrical contact.

Fingers 42, which now extend axially along the shielding tape 24, are attached at portions remote from bar 36 to the shielding tape so as to make electrical contact therewith. Preferably, the end portions 50 only of the fingers 42 are affixed to the shielding tape 24, as by soldering. Since the shielding tape 24 forms a spiral metal sheath having axially adjacent convolutions 52, the lengths of the fingers 42 are varied so that the soldered connections 54 between the fingers 42 and the shielding tape 24 are located at different axial distances from the bar 36 and placed upon selected convolutions 52 of the shielding tape, which selected convolutions may be different adjacent convolutions. The appropriate choice of the position of each soldered connection 54 will place the particular soldered connection 54 within the confines of a convolution 52 so that the soldered connection 54 will not bridge consecutive convolutions. In this manner, the sheath provided by the shielding tape 24 remains undisturbed and the integrity of the shield is maintained.

Once the soldered connections 54 are completed, the connecting device installation may be sealed by wrapping the bared portion 34 of the shielding system 22, the bar 36, the fingers 42 and the clamp 44 with tape 56, as seen in FIG. 1, leaving an integral connecting conductor 60, which is unitary with bar 36, projecting beyond the tape 56 for further connection, as for example for connection to ground. Tape 56 is chosen so as to conform closely to the wrapped components not only for making a good seal against water and other potentially harmful surrounding elements, but for conducting heat away from the wrapped components during service.

In order to allow for thermal expansion of the cables 12 and 14 radially beneath each bar 36, during service of the connecting devices 32, the inner diameter of the inner surface 40 of portion 38 of bar 36 is greater than the outer diameter of the bared portion 34 of the shielding system 22, thereby establishing a radial gap 62 between the bar 36 and the cable (see FIG. 3). The wire strands 26, which pass through the gap 62, tend to centralize the cable within bar 36 to aid in compensating for thermal expansion. Since fingers 42 are somewhat flexible they may be flexed toward the shielding tape 24 for affixing the portions 50 of the fingers to the shielding tape and the fingers will flex in response to thermal expansion and contraction of the cable.

The combination of the weight and integrity of the bar 36, together with the positive securement and contact of the fingers 42 with the shielding tape 24 and the connection between the wire strands 26 and the bar 36 enables the connecting device to carry amounts of electrical current on par with the current-carrying ability of the cable shielding system 22. The ability to maintain the integrity of the electrical connection while compensating for thermal variations, together with the ability to dissipate excessive heat, adds to the current-handling capabilities of the connecting device 32. Hence, connecting devices constructed in accordance with the invention are capable of satisfactory service at higher voltages than heretofore available, i.e., above 35 kV, in connecting devices of the type which are installed easily in the field from component parts manufactured in the factory.

Turning now to FIGS. 7 through 10, another embodiment of the invention is illustrated for use in connection with a high voltage power distribution cable 70 of the type having a conductor 72 surrounded by insulation 74 which, in turn, is surrounded by a shielding system 76 which, in this instance, includes a first shielding tape 78 and a second shielding tape 80 overlying the first shielding tape 78. Again, the shielding system 76 is surrounded by an outer jacket 82.

In preparing the terminal end of cable 70, the shielding tapes 78 and 80 are provided with respective bared portions 84 and 86, the bared portions 86 terminating short of the termination of the shielding system to establish bared portion 84. A connecting device constructed in accordance with the invention is shown at 90 and includes a bar 92 placed adjacent the termination of second shielding tape 80. Bar 92 is a looped member of electrically conductive material, such as copper or aluminum, and has an arcuate configuration with an inner surface 94. The circumferential extent of bar 92 is great enough to extend around a major portion of the shielding system of the cable, and the bar 92 is relatively rigid, but conformable to the required arcuate configuration.

A plurality of fingers 96 of electrically conductive material are affixed to the bar 92 and project therefrom to extend axially along the shielding system 76. Fingers 96 include a first set of fingers 100 projecting axially from the bar 92 in one direction and a second set of fingers 102 projecting in an axially opposite direction. The fingers 100 of the first set are affixed to the first shielding tape 78, and electrically connected thereto, as by soldering portions 104 of fingers 100 which are remote from bar 92, to the shielding tape 78 at soldered connections 106. The fingers 102 of the second set are affixed and electrically connected to the second shielding tape 80 by soldering portions 108 to establish soldered connections at 110. Where corresponding fingers 100 and 102 are in axial alignment, they may be fabricated in the form of a unitary finger element affixed to the bar 92 between the ends of the finger element to provide the axially opposite fingers 100 and 102. The fingers of each set may be constructed in various axial lengths for attachment to selected convolutions of the respective shielding tapes and preferably are spaced circumferentially from one another around the periphery of the bar 92.

The inner diameter of the inner surface 94 of bar 92 is greater than the corresponding diameter of the shielding system 76 so as to provide a radial gap 112 between the bar 92 and the cable 70 for enabling thermal expansion. The relatively flexible fingers 96 are flexed from the bar 92 toward the shielding system 76 for connection thereto and flex to compensate for thermal conditions during operation.

A flexible connecting conductor 114 is secured and connected to bar 92, and thereby made integral with the bar, as by welding, soldering or brazing, and serves to make the appropriate electrical connection. To complete the installation, the components are closely wrapped with tape 116, as described in connection with the embodiment of FIGS. 1 through 6, and connecting conductor 114 passes beyond the tape to enable the appropriate electrical connection. As before, an electrical connector 16 makes the connection between the terminal ends of cables.

It is to be understood that the above detailed description of preferred embodiments of the invention are provided by way of example only. Various details of design and construction may be modified without departing from the true spirit and scope of the invention, as set forth in the appended claims.

The embodiments of the invention in which an exclusive property or privilege is claimed are defined as follows:

1. A connecting device in combination with a high voltage power cable of the type having an inner conductor, insulation surrounding the conductor, and a shielding system including a metallic shield with a layer of overlying wire strands thereon surrounding the insulation, said connecting device comprising:
    (a) an electrically conductive bar circumferentially around a portion of the shielding system in a manner to establish a radial gap between the portion of the shielding system and the bar, the gap being of a size to permit the wire strands to extend therethrough such that the wire strands are enabled to be bent back over an external surface of the bar for electrical connection thereto; and
    (b) a plurality of electrically conductive fingers, all circumferentially spaced and projecting from the bar in a manner to allow the fingers to extend axially along the shielding system when the bar is placed circumferentially thereabout, a first set of the plurality of fingers being of a first axial length and a second set of the plurality of fingers being of a second different axial length, each finger having a portion located remote from the bar and being attached to the shielding system, and each space between the fingers being of a size to allow different ones of the wire strands which extend through the gap to pass between adjacent fingers and be bent back over an external surface of the bar for electrical connection to the bar.

2. The connecting device and high voltage power cable as recited in claim 1, further including a connecting conductor electrically connected to and extending from the bar.

3. The connecting device and high voltage power cable as recited in claim 1, wherein the gap is of a size to allow thermal expansion of the cable radially within the bar.

4. The connecting device and high voltage power cable as recited in claim 2, wherein the metallic shield is in the form of a spiral metal sheath haviang axially adjacent convolutions, the finger portions of the first fingers and the finger portions of the second fingers being located at different axial distances from the bar so as to engage respectively different convolutions of the metallic shield.

5. The connecting device and high voltage power cable as recited in claim 4, wherein each finger portion is electrically connected to its respective convolution by soldering, the soldered connection being physically restricted within confines of the convolution associated therewith.

6. The connecting device and high voltage power cable as recited in claim 2, further including clamping means clamping the wire strands to the cable after they have been bent back over an external surface of the bar.

7. The connecting device and high voltage power cable as recited in claim 6, wherein the bar further includes a circumferentially extending lateral surface for seating thereagainst a corresponding circumferentially extending surface of an outer jacket positioned adjacent the bared region, the circumferentially extending lateral bar surface enabling the bar to be positively located about a desired portion of the bared region.

8. The connecting device and high voltage power cable of claim 2, wherein the bar includes a ferrule receiving therein the wire strands juxtaposed about the bar and electrically connecting the wire strands received within the ferrule to the bar.

9. A method for electrically connecting the shielding system of a high voltage cable with the aid of a connecting device comprising a circumferentially extending electrically conductive bar having a plurality of electrically conductive fingers, all circumferentially spaced and projecting therefrom in an axial direction, first ones of the plurality having a first axially extending length and second ones of the fingers having a second different axially extending length, said method comprising the following steps:

(a) removing an outer portion of the cable to expose a region of the shielding system;

(b) placing the bar over the exposed region of the system and bending the bar thereabout such that the bar extends circumferentially around the exposed region in a manner to provide a radial gap between the exposed region and to allow the spaced fingers to extend axially along the system;

(c) passing different ones of a plurality of wire strands included in the system through the corresponding circumferential spaces between the fingers;

(d) connecting the wire strands passing through the circumferential spaces between the fingers to the bar; and (e) electrically connecting end portions of the first fingers to the system at a first axial distance therefrom and electrically connecting end portions of the second fingers to the system at a second axial distance from the bar.

10. The method as recited in claim 9, further including providing the bar with a connecting conductor.

11. The method as recited in claim 9, wherein step (e) comprises gathering the wire strands in a wire bundle and mechanically and electrically connecting the wire bundle to the bar with a ferrule thereof.

12. The method as recited in claim 11, further including placing a clamp over the wire strands to aid the bar in restraining the wire strands for electrical and mechanical connection of the wire strands thereto.

13. The method of claim 12, further including employing a splicing tape to wrap: the exposed region, the bar; the fingers of the bar; and the clamp therewith in a manner to leave the connecting conductor projecting from beyong the tape for an electrical connection thereto.

14. The method as recited in claim 9, wherein said shielding system is in the form of a spiral metal sheath having axially adjacent convolutions, and wherein the step of electrically connecting the end portions of the fingers to the system further includes soldering the end portions of the first fingers and soldering the end portions of the second fingers to selected convolutions at the first and second axial lengths from which the first and second fingers extend from the bar, respectively.

15. A connecting device in combination with a shielded high voltage power cable of the type having an inner conductor, insulation surrounding the conductor, and a shielding system including a metallic shield surrounding the insulation, said connecting device comprising:

a circumferentially extending electrically conductive bar being placed around a bared portion of the shielding system and having a longitudinal extent great enough to enable the bar to extend circumferentially around a major portion of the circumference of the cable at the bared portion of the shielding system;

a plurality of electrically conductive fingers affixed to the bar, said fingers all being circumferentially spaced and projecting therefrom in an axial direction so as to extend axially along the metallic shield when the bar is so placed circumferentially around the cable;

each finger having an axially extending length and a portion located remote from the bar attached to the metallic shield so as to make electrical contact therewith; and a connecting conductor electrically connected to and extending from the bar; wherein the shielding system includes a second metallic shield overlying the first said metallic shield, the second metallic shield having a bared portion terminating short of the first metallic shield at the bared portion thereof; wherein the fingers project from the bar in opposite axial directions, the fingers including a first set of fingers extending in one direction and a second set of fingers extending in the opposite axial direction such that upon placement of the bar around the metallic shields, adjacent the termination of the second metallic shield, the first set of fingers extending along the first metallic shield and connected thereto and the second set of fingers extending along the second metallic shield and connected thereto; and wherein each metallic shield is in the form of a spiral metal sheath having axially adjacent convolutions and the finger portions are located at different axial distances from the bar for attachment to selected convolutions of the respective metallic shield.

16. The invention of claim 15, wherein at least some of the fingers extend in both axial directions.

* * * * *